Arrows Show Relationship of Flux

↑ Increase in Ampere–turns Causes Increase in Output
↓ Increase in Ampere–turns Causes Decrease in Output June 11, 1957   J. P. MONTGOMERY, JR., ET AL   2,795,751
AMPLIFIER APPARATUS FOR MOTOR CONTROL
Filed April 14, 1955   2 Sheets-Sheet 2

United States Patent Office 2,795,751
Patented June 11, 1957

2,795,751

AMPLIFIER APPARATUS FOR MOTOR CONTROL

James P. Montgomery, Jr., Akron, Ohio, and Donald A. Poepsel, Depew, and Willard Marshall Brittain, Buffalo, N. Y., assignors to Westinghouse Electric Corporation, East Pittsburgh, Pa., a corporation of Pennsylvania Application April 14, 1955, Serial No. 501,223

4 Claims. (Cl. 318—323)

This invention relates to amplifier apparatus and has particular relation to regulators. This application relates to Patent 2,735,059, dated February 14, 1956, to Walter Schaelchlin for Electrical Control Systems, Patent 2,734,391, dated February 14, 1956, to Walter Schaelchlin and Clarance E. Gary for Control Apparatus, Patent 2,693,563, dated November 2, 1954, to William T. Hunt, Jr., for Electrical Motor Control System and application 380,194, filed September 15, 1953, to Walter Schaelchlin and Clarence E. Gary for Control Apparatus, all assigned to Westinghouse Electric Corporation. The latter applications are incorporated in this application by reference.

While in its broader aspects this application comprehends within its scope amplifier apparatus generally, it concerns itself in its specific aspects with amplifying apparatus for sectional paper machine drives in which magnetic amplifiers have been applied in conjunction with mechanical differential units to control the paper feed rolls so that the web does not tear or does not build up because of differences in speed between the rolls. In spite of the fact that the amplification in sectional paper mill regulators of the prior art type is adequate to provide the necessary precision, such apparatus has in practice on occasions failed to afford the required regulation.

It is accordingly specifically an object of the invention to suppress the occurrence of such failures in the operation of the sectional paper mill regulator apparatus.

Another and broader object of this invention is to provide novel amplifier apparatus particularly suitable for use in paper mill regulators.

This invention arises from the realization that the failure of the prior art regulator apparatus to operate properly is caused by the variation in the voltage of the alternating current which supplies the apparatus. This apparatus includes magnetic amplifiers, usually an input magnetic amplifier stage and an output magnetic amplifier stage. Each of these stages has impressed in circuit with its output winding means an alternating potential. In addition, the input winding means of the input stage is supplied from a so-called position rotating inductor or rotary transformer which is responsive to changes in the position of the web. This inductor is in effect a variable transformer which produces changes in the output alternating potential for a given input alternating potential in dependence upon the changes in the position of its rotor. This input alternating potential is derived from the same supply as the alternating potential for the amplifier stages. Variations in the supply potential then changes not only the stage potential but also the amplifier input alternating potential supplied to the inductor and produces variations in the output which are amplified. The variations in the supply potential thus result in accumulated variations in the output of the amplifier and in corresponding irregularities of substantial magnitude in the speed of the web controller.

It is accordingly a specific object of this invention to suppress the effect of variations in the alternating potential which is impressed on the position variable inductor and in circuit with the output winding means of the magnetic amplifier stages.

The above described variations in the alternating current supply could be suppressed by providing a regulator through which the potentials could be supplied. But an adequate regulator for this purpose would have a high rating and would thus be very costly. It is then desirable to effect the necessary correction for voltage variations in another way than by providing a regulator of high rating, and this is another specific object of the invention.

In accordance with the invention, the correction is effected by so connecting the magnetic amplifiers that they cooperate to limit the effect of variations on the supply and to compensate for such variations in such manner that they are suppressed. Specifically, the potential for the input amplifier stage is derived through a regulator so that it is independent of variations in the supply potential while the potential of the output stage is supplied directly from the supply and does vary with the potential of the supply and the latter variations are compensated by the magnetic amplifier. The bias of the amplifier is set so that the amplifier delivers maximum output when the signal from the position generator is at a minimum and minimum output when this signal is at a maximum. A change in the output of the position generator of a given sense or polarity results in a change of the opposite polarity in the output of the output magnetic amplifier and a voltage variation occurring at the input of the position generator results in a variation of the opposite polarity at the output of the amplifier, and this variation is compensated by the variation produced by the voltage impressed in circuit with the output winding means of the output amplifier, since this latter variation is of the same polarity as the variation at the input of the position generator. Further, the apparatus which produces the error signal in the position generator is so set that with the amplifier biased as described above, the effect of the amplifier is to compensate in response to actual error signals.

The novel features considered characteristic of this invention are described generally above. The invention itself, both as to its organization and its method of operation, together with additional objects and advantages thereof, will be understood from the following description of specific embodiments when read in connection with the accompanying drawings, in which.

Figure 1:
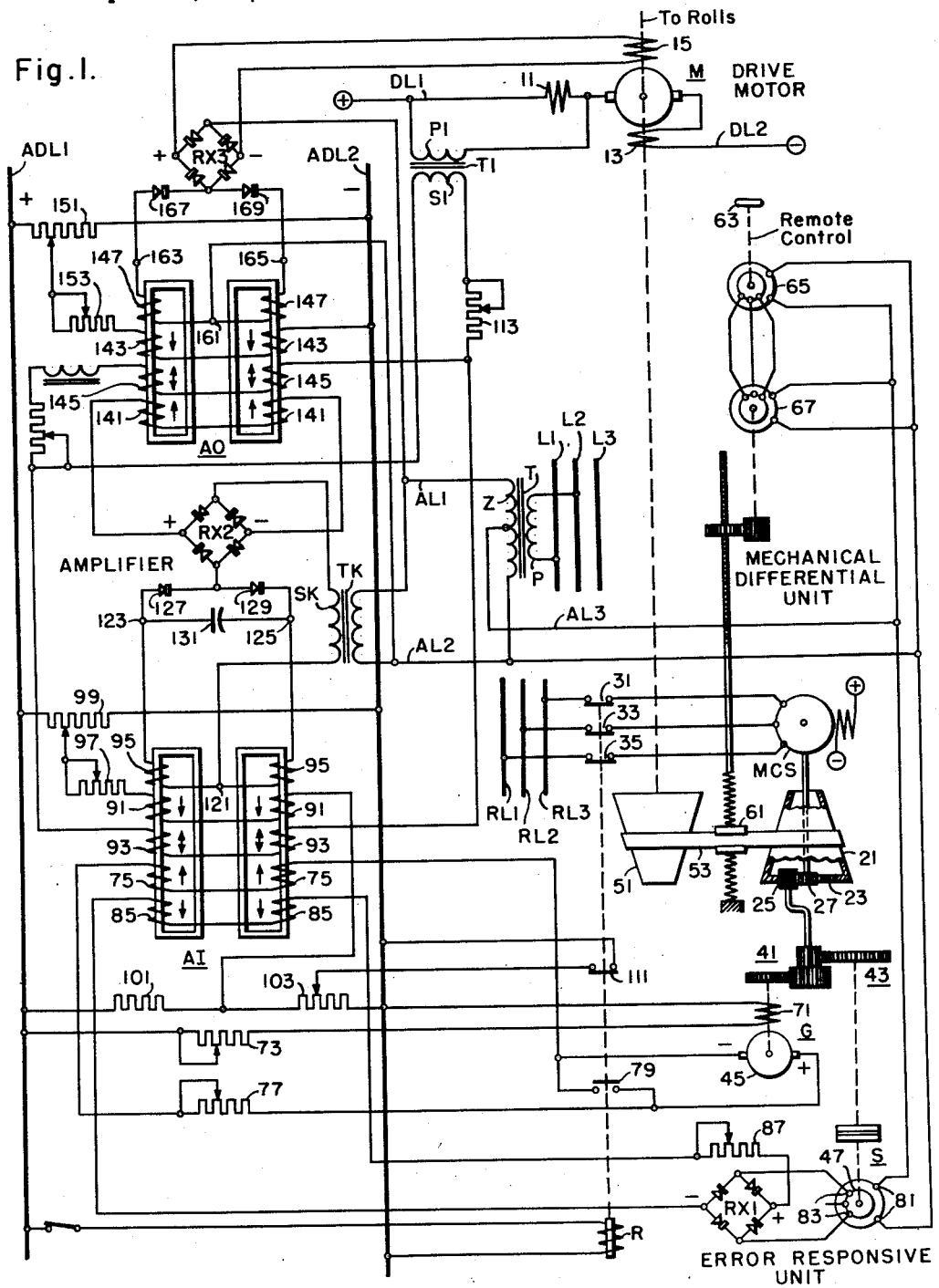
Figure 1 is a circuit diagram of a regulator in accordance with the invention.

The apparatus shown in Fig. 1 is a circuit diagram of a section of a sectional paper mill drive. This apparatus includes a Drive Motor M for driving the paper mill rolls (not shown), a Mechanical Differential Unit, for detecting errors in the speed of the web, an Error Responsive Unit, and an Amplifier. The Drive Motor is supplied with direct current through conductors DL1 and DL2 which derive their power from a generator (not shown). Other components of the apparatus are supplied from power supply buses or conductors L1, L2, L3 which may derive their power from the usual commercial alternating current supply. For components of the apparatus which require alternating current power of a voltage different from that available at the conductors L1, L2 and L3, auxiliary alternating current conductors AL1, AL2 and AL3 are provided. These conductors AL1, AL2, AL3 derive their power through a transformer T, the primary P of which is supplied from the conductors L1 and L2 and the secondary Z of which has terminals connected to the conductors AL1 and AL2 and an intermediate tap connected to the conductor AL3. In addition, direct current power is supplied by conductors ADL1 and ADL2 which may be energized in the usual manner preferably from a separate direct current generator. When the commercial supply varies, the potential available between the conductors L1, L2, L3 and AL1, AL2 and AL3 also varies. In addition, variable frequency, variable voltage power is supplied through conductors RL1, RL2, RL3 to the reference synchronous motor MCS. The source of this power is the alternating current cue alternator (not shown), which is driven from a variable speed motor (not shown) in turn supplied from the master generator (not shown) of the system.

The Drive Motor is of the direct current type including a rotor, a commutating field winding 11, a series field winding 13 and a shunt field winding 15. In accordance with the preferred practice of the invention, the correcting effect is applied through the shunt field winding 15 and for this purpose this winding is connected to the output of the Amplifier.

The Mechanical Differential Unit includes a cone pulley 21 which is responsive to the speed and position of the web and which carries a ring gear 23 on its larger base. The ring gear 23 is engaged by a planet gear 25 which, in turn, is driven by a sun gear 27. The latter is driven by a constant speed motor MCS which serves as a reference. The motor MCS is of the three-phase alternating current type and is supplied from the conductors RL1, RL2 and RL3 through the contacts 31, 33, 35 of a start and stop relay R which is energized when the apparatus is in operation. The frequency and voltage of the power supplied to the motor MCS are variable and dependent upon the desired speed of operation or production of the system. The movement of the planet gear 25 is transferred through gearing systems 41 and 43 respectively to the rotor 45 of a direct current generators G and to the rotor 47 of a generator S, both in the Error Responsive Unit. The ratio of the gearing systems 41 and 43 is such that the speed is increased in being impressed on the rotor of the generator G and is decreased in being impressed on the generator S so that when the relative position of the web changes, the generator G produces a voltage proportional to the rate of change and the output of the generator S varies in proportion with the magnitude of the change. The Mechanical Differential Unit also includes another cone pulley 51 which is driven from the Drive Motor M and, in turn, drives the other pulley 21 through a belt 53. Any correcting movement of the Drive Motor is thus impressed on the gearing systems 41 and 43 and serves to provide a signal to the Error Responsive Unit that a correction has been effected. The position of the belt may be set by a yoke 61 resiliently coupled to the belt 53. The latter may be in turn remotely controlled from a knob 63 through transmitter synchrotie 65 and a receiver synchrotie 67. Thus manual facilities for controlling the paper mill section are available.

In the Error Responsive Unit, the generator G has in addition to the rotor 45 a field winding 71 which is supplied from the conductors ADL1 and ADL2 through a variable resistor 73. The brushes of the generator G are connected to a set of input windings 75, which may be called the rate input windings, the input magnetic amplifier AI through a variable resistor 77. These brushes may be short-circuited by normally closed contacts 79 of the relay R when the relay R is deenergized. This short circuit is applied so that the speed error of the constant speed motor MCS and direct current motor M in coasting to a stop is not impressed on the Amplifier.

The rotating inductor S includes input terminals 81 which are supplied with alternating current from the conductors AL2 and AL3 and output terminals 83. The output terminals are connected through a rectifier RX1, preferably of the bridge type, to another set of windings 85, which may be called the position input windings of the input amplifier AI through a variable resistor 87.

When any change occurs in the position of web and the planet gear 25 is rotated, the resulting rotation of the generator G produces a voltage which is responsive to the rate of change of the position of the web and the resulting rotation of the rotor 47 of the inductor S produces a change in voltage which is responsive to the change in relative position of the web. These voltages are impressed on input windings 75 and 85 of the amplifier AI and produce a change in its output.

The Amplifier includes in addition to the input magnetic amplifier AI the output magnetic amplifier AO. The input magnetic amplifier AI includes, in addition to the rate input and position input windings 75 and 85, bias windings 91, auxiliary windings 93 and output windings 95. The bias windings 91 are connected through a resistor 92 between the adjustable arm of a voltage divider 99 connected between the conductors ADL1 and ADL2 and the junction of a fixed resistor 101 and a variable resistor 103 also connected between conductors ADL1 and ADL2. The resistor 99 and the resistors 101 and 103 in effect constitute a bridge network for setting the bias. The amplifier AI may be set to operate in a predetermined region of its characteristic by setting the bridge and the resistor 97. In the practice of the invention, the amplifier AI is set to operate in such manner that its output is at a maximum for a minimum input position signal or is at a minimum for a maximum output position signal. Naturally, the current from rectifier RX1 through the winding 85 must be poled properly to achieve this result; that is, the effect of the current must affect the effect of the bias through resistor 97. The adjustable arm of the variable resistor 103 is connected to conductor ADL2 through a contact 111 of relay R which is closed in the operating position of the relay (when the relay is energized). When the relay R is deenergized this contact 111 is opened and the negative potential of the intermediate terminal to which the bias windings 91 are connected is decreased. The resistors 101 and 103 are so related that under such circumstances the output of the amplifier AI becomes zero.

Figure 2:
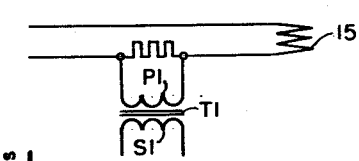
Fig. 2 is a fragmental circuit diagram showing a modification of the invention.

The auxiliary windings 93 are supplied in accordance with the current flow through the commutating field windings 11 through a transformer T1 having a primary P1 connected across the field winding 11 and a secondary S1 connected through a variable resistor 113 across the auxiliary windings 93. Alternatively as shown in Fig. 2, the primary P1 may be connected across the resistor in series with the shunt field winding 15 and the potential for the auxiliary windings 93 may then be derived from the shunt field current. In either event, the effect of the current flow through the winding 93 is to limit the output of the amplifier AI during changes of currents so as to provide damping for the regulator system.

The output windings 95 are supplied from the conductors AL1 and AL2 through a constant potential transformer TK. Specifically, this transformer may be of the type sold by Sola Electric Company of 2525 Clybourn Avenue, Chicago, Illinois, and described in such leaflets of this organization as Bulletin SM-22GP3-29 or other like bulletins. Constant potential transformers of the type involved here are also sold by Raytheon Manufacturing Company of West Newton, Massachusetts, and other organizations. A transformer TK having a rating of about .3 to .5 kva. is adequate for the apparatus disclosed in Fig. 1. The output windings 95 have an intermediate connection 121 and the secondary SK of the transformer TK is connected between this intermediate connection 121 and the terminal connections 123 and 125 through a rectifier bridge RX2 and a pair of rectifiers 127 and 129 each poled to conduct positive current from one terminal of the windings to the other terminal. By positive current, the flow of positive ions or holes as distinct from electrons is meant. Across the output windings 95 a capacitor 131 is connected to smooth out any variations produced by the alternating current. The rectifiers 127 and 129 conduct current of only one polarity through the windings 95 so that a self-saturating effect is produced.

The amplifier AO includes input windings 141, bias windings 143, auxiliary windings 145 and output windings 147. The input windings 141 are connected to the direct current terminals of the rectifier RX2 so that any direct current supplied by the rectifier RX2 flows through the input windings. The bias windings 143 are connected between the adjustable arm of a voltage divider 151 between conductors ADL1 and ADL2 on conductor DL2 through a variable resistor 153. The divider 151 and the resistor 153 are so set with reference to the polarity of the current supplied through the input winding 141 that the output of amplifier AO is a maximum for maximum input in its winding 141 from the input stage AI and a minimum for minimum input from the input stage AI. Preferably the amplifier may be biased to cut off by the current winding 143. The auxiliary windings 145 are connected across the secondary S1 through variable resistor 113, another variable resistor 155 and a reactor 157. The output windings 147 have an intermediate connection 161. These windings are supplied from the conductors AL1 and AL2 directly. For this purpose, the intermediate connection 161 is connected to the conductor AL2 and the terminals 163 and 165 of the windings 147 are connected to the conductor AL1 through a bridge rectifier RX3 and through a pair of rectifiers 167 and 169 poled to conduct positive current from one of the terminals 163 to the other 165. The direct current terminals of the rectifier RX3 are connected across the field winding 15 of the Drive Motor M through the resistor 17.

The relationship between the output of the amplifiers AI and AO and the current flow through their windings is presented by the arrows in the drawings.

In accordance with the invention, the biasing current through the bias windings is so set that the polarity of the amplification is opposite to the polarity of the magnitude of the signal which is delivered by the generator S. That is, the output of the Amplifier is a maximum when the output of the generator S or of the rectifier RX1 is a minimum and the output of the Amplifier is a minimum whne the output of the generator S or the rectifier RX1 is a maximum. The effect of this setting may be understood from a consideration of Figs. 3 through 4.

Figure 3:
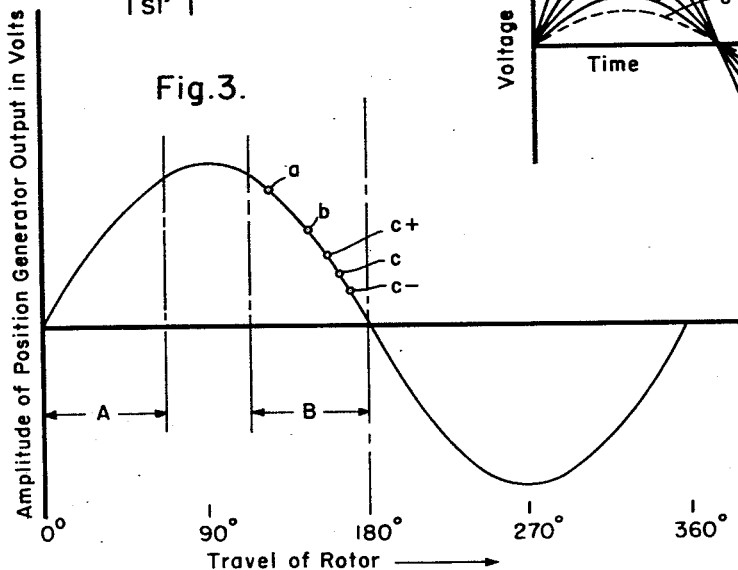

The inductor S is, in effect, a variable transformer, the amplitude of the output of which varies in accordance with the position of its rotor 47. In Fig. 3 this amplitude is plotted vertically as a function of the position of the rotor 47 plotted horizontally. The plot is a sine wave curve. The significance of this curve is that for every position of the rotor 47 an alternating current potential is produced, the amplitude of which is determined by the ordinate of the curve. Thus, consider the positions labelled $a$, $b$ and $c$ on the curve of Fig. 3. The voltage corresponding to these positions is plotted vertically as a function of time plotted horizontally. To each of the positions $a$, $b$, $c$ alternating potential represented by the correspondingly labelled sine waves of Fig. 4 correspond. The voltage at point $a$ is seen to have the highest amplitude, that at point $b$ the next and that at point $c$ the lowest. The bias windings 91 and 143 of the amplifiers AI and AO are so set that the output of the Amplifier is low for a high point such as $a$ and is high for a low point such as $c$.

Now assume that when the speed of motor M increases with respect to the speed of the reference motor MCS, the rotation of the rotor 47 is as shown in Fig. 3. In accordance with the invention, the inductor S must be set to operate in a quadrant for which the amplitude of the output decreases as the angle of displacement increases, and for which the direction of rotation of the rotor is identical to that caused when the motor M speed is greater than the reference motor MCS speed. In accordance with the invention then, the inductor S is set to operate in a quadrant which corresponds to the portion of the Fig. 3 curve which is labelled B while in accordance with the teachings of the prior art, the operation of the inductor S is in a quadrant corresponding to the portion of the curve of Fig. 3 which is labelled A. Thus, if the inductor S has a setting at any instant corresponding to point $c$, an increase in the angle of the setting to point $c-$ produces a decrease in the amplitude of the output and a decrease in the angle of setting results in an increase in the amplitude as at point $c+$. The resulting potentials delivered at the output terminals 83 of the inductor S are represented by the dash-dot curve $c+$ of Fig. 4 and the broken line curve $c-$ of Fig. 4.

The effect of such a setting of the inductor S and of the bias of the Amplifier may now be considered first for a variation in the voltage between conductors AL1 and AL2 occurring in the absence of a change in the web and second for a change in the web in the absence of a variation in the voltage between conductors AL1 and AL2. A variation in the voltage AL1—AL2 produces a variation of the same polarity at the input 81 of the inductor S which results in a variation of the same polarity at the output terminals 83 and at the rectifier RX1, but results in a change of opposite polarity at the output of the Amplifier. But since the variation across the conductors AL1 and AL2 is of the same polarity as the variation at the input terminals 81 of inductor S and the potential at the conductors AL1 and AL2 is impressed in circuit with the output windings 147 of the amplifier AO, the two potentials counteract each other and the result is that the effect of the variation in the voltage is suppressed.

Now a change in the web produces an increase or a decrease in the angle of position of rotor 47. On the basis of the assumption that an increase in the speed of motor M with reference to motor MCS produces the rotation of rotor 47 indicated in Fig. 3, such an increase in speed produces a decrease in the voltage of inductor S which appears as an increase at the output of the Amplifier. Increased current thus flows through the field 15, the speed of the motor M is decreased and a correction of the proper polarity is thus introduced. Corresponding correcting effect is produced for a decrease in the angle of the rotor 47. Thus, the motor should be so set that a change in the web requiring a decrease in the speed of the motor M increases the angle of the rotor 47 and a change requiring increased speed of motor M produces a decrease in the angle.

Figure 5A:
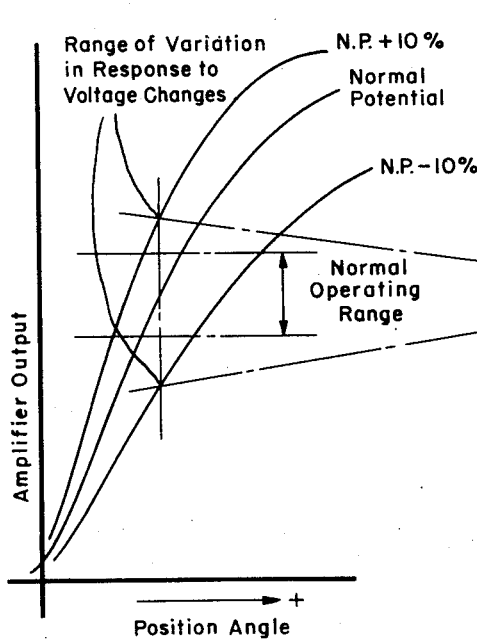
Figs. 5a and 5b are further graps showing how the improvement is effected in accordance with the invention.
Figure 5B:
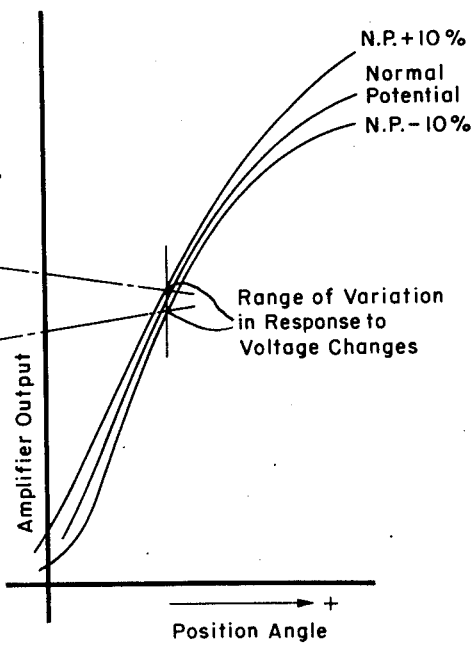

This may be understood by reference to Figs. 5a and 5b. In each of these views, the output of the Amplifier is plotted vertically as a function of the position angle plotted horizontally. Fig. 5a corresponds to prior art apparatus and Fig. 5b to apparatus in accordance with the invention. The curves in Figs. 5a and 5b are plotted for voltage inputs to the inductor S corresponding to the normal desired potential, a variation of +10% from the normal potential and a variation of —10% from the normal potential.

In accordance with the teachings of the prior art, the inductor S is set so that it operates in the quadrant corresponding to portion A of Fig. 3 and the Amplifier is set so that its amplification is of the same polarity as the magnitude of the output of the inductor S. Under such circumstances the Amplifier output is a maximum for a maximum output of the inductor S and a minimum for a minimum output of the inductor S. For changes in position angle in a positive sense, that is from 0 toward 90° then, the amplitude of the output of the inductor S increases and the output of the Amplifier also increases. The curves of Fig. 5a show this corresponding increase as the position angle of the rotor 47 of the inductor S increases. From Fig. 5a it is seen that in prior art apparatus the corresponding output of the Amplifier varies over a wide range for this variation.

Figure 4:
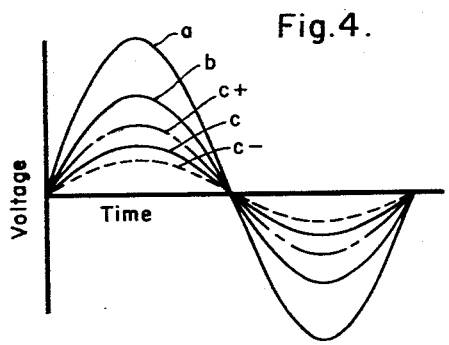
Figs. 3 and 4 are graphs illustrating the operation of the invention.

The improvement effected by the invention is illustrated in Fig. 5b. This case corresponds to a setting of the inductor to operate in portion B of Fig. 3. In this case an increase in the angle of setting of the rotor 47 of the inductor S results in a decrease in the amplitude of the output of the inductor (Figs. 3 and 4). But the effect of the amplifier is to produce the maximum response for the minimum amplitude output of the inductor and a minimum response for the maximum amplitude output of the inductor, and for this reason the slopes of the curves of Fig. 5b are positive in the same manner as the increasing slopes of the curves of Fig. 5a. But the effect of the changes in the voltage at the input terminals of the inductor does not produce changes of the same polarity in the apparatus corresponding to Fig. 5b as it does for the apparatus corresponding to Fig. 5a, because in the apparatus represented by Fig. 5b the changes are counteracted by changes of the opposite polarity in the potential which supplies the output amplifier AO. Thus, the counteracting effect of the Amplifier is to reduce the variations resulting from variations in the voltage at the terminals of the generator to a low magnitude.

In the use of the apparatus, the Motor M is connected to drive the rolls of a section of a sectional paper mill. The remote control knob 63 is then adjusted so that the Motor is at the desired speed. So long as this speed is maintained, the output of the generator G is zero and the output of the inductor S is at a predetermined potential that the shunt field current of the motor is that corresponding to the setting. If as the operation now continues the voltage at the output terminals 83 of the inductor S changes as a result of a corresponding change in the voltage between the conductors AL1 and AL2, a change of the opposite polarity tends to occur in the output of the Amplifier, but this change is compensated by a change of the same polarity between the conductors AL1 and AL2 which is impressed in circuit with the output windings of the amplifier AO. If during operation a change occurs in the web, this change is translated into a voltage at the output brushes of generator G which is proportional to the rate of the change in the web and a change in the potential at the output terminals 83 of the inductor S which is proportional to the magnitude of the change in the web. The potential at generator G and the change in potential at the output terminals of inductor S are such that a change is produced in the current of the shunt field of Motor M to counteract the change in the web.

While certain specific embodiments of the invention have been disclosed herein, many modifications thereof are practicable. The invention, therefore, is not to be restricted except as is necessitated by the spirit of the prior art.

We claim as our invention:

1. In combination, a first magnetic amplifier having input winding means, biasing means and output winding means, a second magnetic amplifier having input winding means, biasing means and output winding means, error responsive means having input terminals and output terminals, first means connected to said input terminals for impressing a first potential on said input terminals, means connecting said output terminals to said input winding means of said first amplifier, means connecting said output winding means of said first amplifier to said input winding means of said second amplifier, said connecting means including second means connected to said first means for impressing a second potential in circuit with said output winding means of said first amplifier, and third means connected to said first means and to said output winding means of said second amplifier for impressing a third potential on said last-named output winding means, the said combination being characterized by the fact that said second means impresses a second potential which is substantially independent of variations in said first potential, and said third means impresses a potential which varies with variations in said first potential, by biasing means which biases said amplifiers so that a variation of either sense in the potential at said output terminal is amplified in the opposite sense and by error responsive means so set that an error of either sense produces a variation in the voltage of said output terminals such as to correct said error.

2. A regulator comprising a rotating inductor responsive to the error to be regulated and having input terminals and output terminals, alternating current supply means, means connected to said supply means for impressing a first alternating potential between said input terminals whereby an alternating potential including an error component is derivable from said output terminals, a first magnetic amplifier having input winding means and output winding means, means connecting said output terminals to said input winding means, a second magnetic amplifier having input winding means and output winding means, a regulating circuit, means connected to said supply means and to the output winding means of said first amplifier for impressing a second potential on said output winding means of said first amplifier whereby an output signal is derivable from the output winding means of said first amplifier, means connected to said input winding means of said second amplifier for impressing said last-named output signal on said input winding means of said second amplifier, second means connected to said supply means and to the output winding means of the second amplifier for impressing a third alternating potential on the output winding means of said second amplifier whereby an output signal is derivable therefrom, and means connected to said regulator circuit and said output winding means of said second amplifier for impressing said last-named output signal in said regulator circuit, the said regulator being characterized by the fact that said first means connected includes means for maintaining said second potential constant independently of variation in said supply means, said amplifiers are so set as to produce a minimum output for a maximum signal at said output terminals and a maximum output for a minimum signal at said output terminals, and said inductor is so set and said means connected to said regulating circuit is such that on the occurrence of an error the output of said second amplifier is of a polarity such as to correct said error.

3. A regulator comprising means responsive to the error to be regulated and having input terminals and output terminals, alternating current supply means, the potential derivable from said alternating current supply means being subject to variation, means connected to said supply means and to said responsive means for impressing a first alternating potential on said input terminals whereby a potential including an error component is derivable from said output terminals, a first amplifier having input network means and output network means, means connecting said output terminals to said input network means, a second amplifier having input network means and output network means, a regulating circuit, first means connected to said supply means and to said output network of said first amplifier for impressing a second alternating potential in said last-named output network, whereby a signal including an error component is derivable from said output network means, means connected to said input network means of said second amplifier for impressing said last-named signal on said input network means of said second amplifier, second means connected to said supply means and to said output network means of said second amplifier for impressing a third alternating potential on said output network means of said second amplifier whereby an output signal including an error component is derivable from said last-named output network means, and means connected to said regulator circuit for impressing said last-named output signal in said regulator circuit, the said regulator being characterized by the fact that said first means connected includes means for maintaining said second potential constant independently of variations in said supply potential and said amplifiers are so set as to produce a minimum output at said output network means of said second amplifier for a maximum signal at said output terminals and a maximum output at said output network means of said second amplifier for a minimum signal at said output terminals.

4. The method of operating a regulator for a drive, said regulator including a cascaded amplifier system including an input amplifier stage and an output amplifier stage, each of said amplifier stages having input winding means and output winding means, said output winding means of said output stage being connected to said drive to regulate said drive, said connection being such that a deviation of said drive of one polarity is compensated by a signal having a correcting component of the opposite polarity, a first alternating current potential being impressed in circuit with said output winding means of said output stage and said drive from a supply subject to variation, said first alternating potential varying with said supply, and a second alternating potential of substantially constant amplitude being impressed in circuit with said output winding means of said input stage and said input winding means of said output stage, said regulator also including error signal producing means responsive to said drive for producing an error signal, said error signal being impressed on said input winding means of said input stage, said error signal producing means being supplied with a third alternating potential from said supply and said error signal depending on said third potential and varying with said supply and also varying in dependence upon deviations in said drive; the said method comprising setting said input stage so that its output signal increases as said error signal decreases and its output signal decreases as said error signal increases, whereby said input stage has an output which varies inversely as said supply varies and as said drive deviates, and setting said output stage so that its output signal decreases as its input signal decreases, whereby said output stage has a first output component which varies inversely as said supply varies, and a second output component which varies inversely as said drive deviates, said first component being compensated by said first potential.

References Cited in the file of this patent

UNITED STATES PATENTS 2,693,563    Hunt _____ Nov. 2, 1954